(12) United States Patent
Riis et al.

(10) Patent No.: US 6,840,687 B2
(45) Date of Patent: Jan. 11, 2005

(54) SYSTEMS AND METHODS FOR LOW-LOSS SPLICING OF OPTICAL FIBERS

(75) Inventors: Lars Riis, Broenshoej (DK); Tonny Sorensen, Smoerum (DK); Torben E. Veng, Roskilde (DK)

(73) Assignee: Fitel USA Corp., Norcross, GA (US)

( * ) Notice: Subject to any disclaimer, the term of this patent is extended or adjusted under 35 U.S.C. 154(b) by 23 days.

(21) Appl. No.: 10/197,184

(22) Filed: Jul. 17, 2002

(65) Prior Publication Data

US 2003/0012526 A1 Jan. 16, 2003

Related U.S. Application Data

(63) Continuation-in-part of application No. 09/778,444, filed on Feb. 7, 2001, now Pat. No. 6,565,269.

(51) Int. Cl.[7] .............................................. G02B 6/255
(52) U.S. Cl. .............................. 385/95; 385/96; 385/97
(58) Field of Search ..................... 385/95–99, 123–126; 156/64, 158

(56) References Cited

U.S. PATENT DOCUMENTS

| 4,326,870 A | 4/1982 | Bendit et al. |
| 6,336,749 B1 | 1/2002 | O'Toole et al. |
| 6,565,269 B2 * | 5/2003 | Riis et al. ..................... 385/95 |
| 2001/0022879 A1 | 9/2001 | Wu |

* cited by examiner

Primary Examiner—Phan T. H. Palmer
(74) Attorney, Agent, or Firm—Priest & Goldstein, PLLC (57) ABSTRACT

Techniques and systems are described for reducing splice loss in an optical fiber transmission line. One described technique includes splicing together at a splice point a first fiber having a first modefield diameter to a second fiber having a second modefield diameter larger than the first modefield diameter. The splice point is heated to a core expansion temperature to cause a controlled thermal diffusion of core dopant in the first fiber in order to reduce modefield mismatch between the first and second fibers. Splice loss is then reduced by heating the splice point to a differential diffusion temperature to cause a controlled diffusion of a cladding dopant in the first fiber, while maintaining the expanded core.

19 Claims, 11 Drawing Sheets

SPLICE LOSS @ 1550 nm FOR DCF SPLICED TO SSMF

| TRIAL NO: | TIME (min): | INITIAL LOSS IN FLAME (db): | FINAL LOSS (db): |
|---|---|---|---|
| #1 | 18 | 1.37 | 0.12 |
| #2 | 19 | 1.22 | 0.13 |
| #3 | 18 | 0.92 | 0.10 |
| #4 | 16 | 1.77 | 0.14 |
| #5 | 19 | 1.61 | 0.14 |
| #6 | 16 | 1.66 | 0.11 |
| #7 | 17 | 1.57 | 0.12 |
| #8 | 19 | 1.09 | 0.14 |
| #9 | 18 | 1.71 | 0.14 |

FIG. 22

SPLICE LOSS @ 1550 nm AND BREAK LOADS OF SPLICES AFTER HEAT-TREATMENT

| TRIAL NO: | FINAL LOSS (db): | BREAK LOAD (kpsi): |
|---|---|---|
| #1 | 0.11 | 283 |
| #2 | 0.13 | 265 |
| #3 | 0.11 | 313 |

SYSTEMS AND METHODS FOR LOW-LOSS SPLICING OF OPTICAL FIBERS

RELATED APPLICATIONS

The present application is a continuation-in-part of U.S. patent application Ser. No. 09/778,444, filed on Feb. 7, 2001 now U.S. Pat. No. 6,565,269, assigned to the assignee of the present application, which is incorporated herein by reference in its entirety.

BACKGROUND OF THE INVENTION

1. Field of the Invention

The present invention relates generally to improvements to techniques used to splice optical fiber, and more particularly to advantageous aspects of systems and methods for low-loss splicing of optical fibers.

2. Description of the Prior Art

A new class of optical fibers has recently been developed known as dispersion-compensating fiber (DCF), which has a steeply sloped, negative dispersion characteristic. One use for DCF is to optimize the dispersion characteristics of already existing optical fiber links fabricated from standard single-mode fibers (SSMF) for operation at a different wavelength. This technique is disclosed in U.S. patent application Ser. No. 09/596,454, filed on Jun. 19, 2000, assigned to the assignee of the present application, the drawings and disclosure of which are hereby incorporated by reference in their entirety.

An important parameter for DCF is the excess loss that results when DCF is spliced to other types of fiber, such as SSMF. To obtain a highly negative dispersion, DCF uses a small core with a high refractive index, having a modefield diameter of approximately 5.0 μm at 1550 nm, compared with the approximately 10.5 μm modefield diameter of SSMF at 1550 nm. The difference in core diameters results in significant signal loss when a fusion splicing technique is used to connect DCF to SSMF. It is possible to reduce the amount of signal loss by choosing splicing parameters that allow the core of the DCF to diffuse, thereby causing the modefield diameter of the DCF core to taper outwards, resulting in a funneling effect. However, the high concentration of fluorine dopant in typical DCF limits the application of this technique, because the amount and duration of the heat required to produce the funneling effect may result in an undesirable diffusion of the fluorine dopant.

There is thus a need for improved techniques for splicing DCF to SSMF that reduce splice loss below current limits.

SUMMARY OF THE INVENTION

The above-described issues and others are addressed by the present invention, aspects of which provide methods and systems for reducing splice loss in an optical fiber transmission line. A method according to the invention includes splicing together at a splice point a first fiber having a first modefield diameter to a second fiber having a second modefield diameter larger than the first modefield diameter. The splice point is heated to a core expansion temperature to cause a controlled thermal diffusion of core dopant in the first fiber in order to reduce modefield mismatch between the first and second fibers. Splice loss is then reduced by heating the splice point to a differential diffusion temperature to cause a controlled diffusion of a cladding dopant in the first fiber, while maintaining the expanded core.

Additional features and advantages of the present invention will become apparent by reference to the following detailed description and accompanying drawings.

DETAILED DESCRIPTION

Aspects of the present invention provide systems and methods for fabricating a low-loss optical transmission line, including a dispersion compensating fiber (DCF) that is spliced to another type of fiber, such as a standard single mode fiber (SSMF). It will be appreciated that the systems and techniques described herein may be applied to other types of fibers and fiber dopants without departing from the spirit of the invention. Further, the techniques described below may be practiced singly, or in combination with each other.

Figure 1:
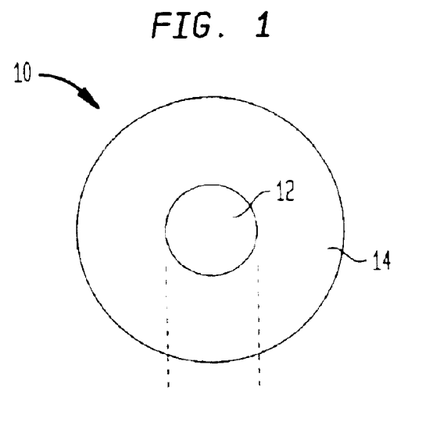
FIG. 1 is a radial cross section diagram of a sample standard single-mode fiber (SSMF), not drawn to scale.
Figure 2:
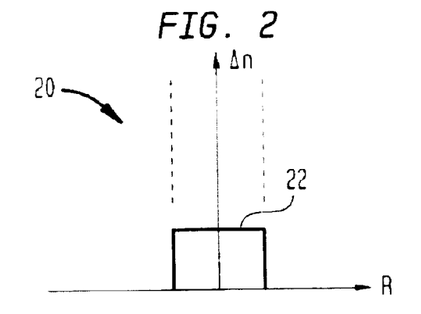
FIG. 2 is a graph illustrating a refractive index (RI) profile for the SSMF shown in FIG. 1.

FIG. 1 shows a cross section of an exemplary length of SSMF 10. SSMF is typically fabricated from silica ($SiO_2$). The SSMF 10 includes a germanium-doped core 12 and an undoped outer cladding layer 14 surrounding the core 12. FIG. 2 shows the refractive index (RI) profile 20 for the SSMF 10. As shown in FIG. 2, the SSMF RI profile 20 includes a central plateau 22 corresponding to the SSMF core 12.

Figure 3:
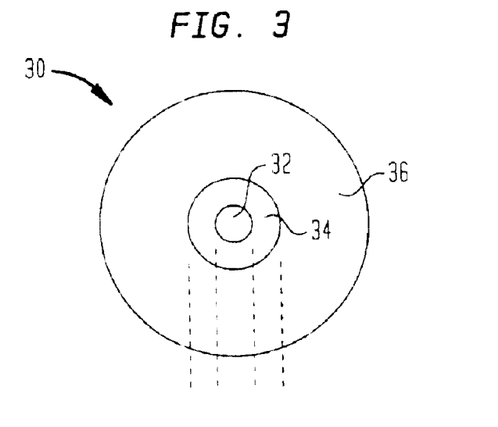
FIG. 3 is a radial cross section diagram of a sample dispersion compensating fiber (DCF), not drawn to scale.
Figure 4:
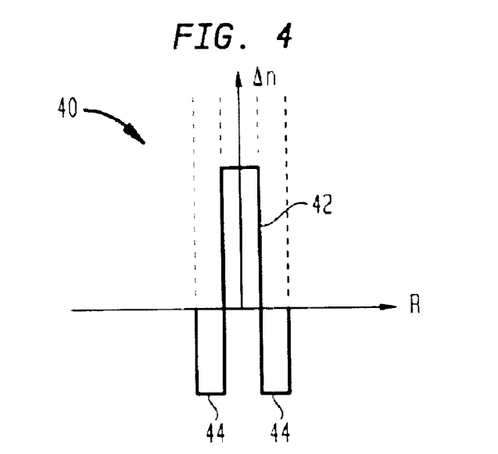
FIG. 4 is a graph illustrating an RI profile for the DCF shown in FIG. 3.

FIG. 3 shows a cross section of an exemplary length of DCF 30. DCF is also typically fabricated from silica. The DCF 30 shown in FIG. 3 includes a germanium-doped core 32, a fluorine-doped first cladding layer 34, and an undoped outer cladding layer 36. FIG. 4 shows the RI profile 40 for the DCF 10. As shown in FIG. 4, the DCF RI profile 40 includes a central spike 42 corresponding to the DCF core 32, and a pair of deep trenches 44 on either side of the spike 42, corresponding to the fluorine-doped cladding layer 34. In order to achieve the spike 42 and trenches 44 in the RI profile 40, a heavy concentration of germanium dopant is used in the DCF core 32, and a heavy concentration of fluorine dopant is used in the DCF first cladding layer 34. It should be noted that certain DCF fibers may have different RI profiles and dopants concentrations from the present example. However, it will be appreciated from the present description that the invention is also applicable to these other DCF fibers.

Figure 5:
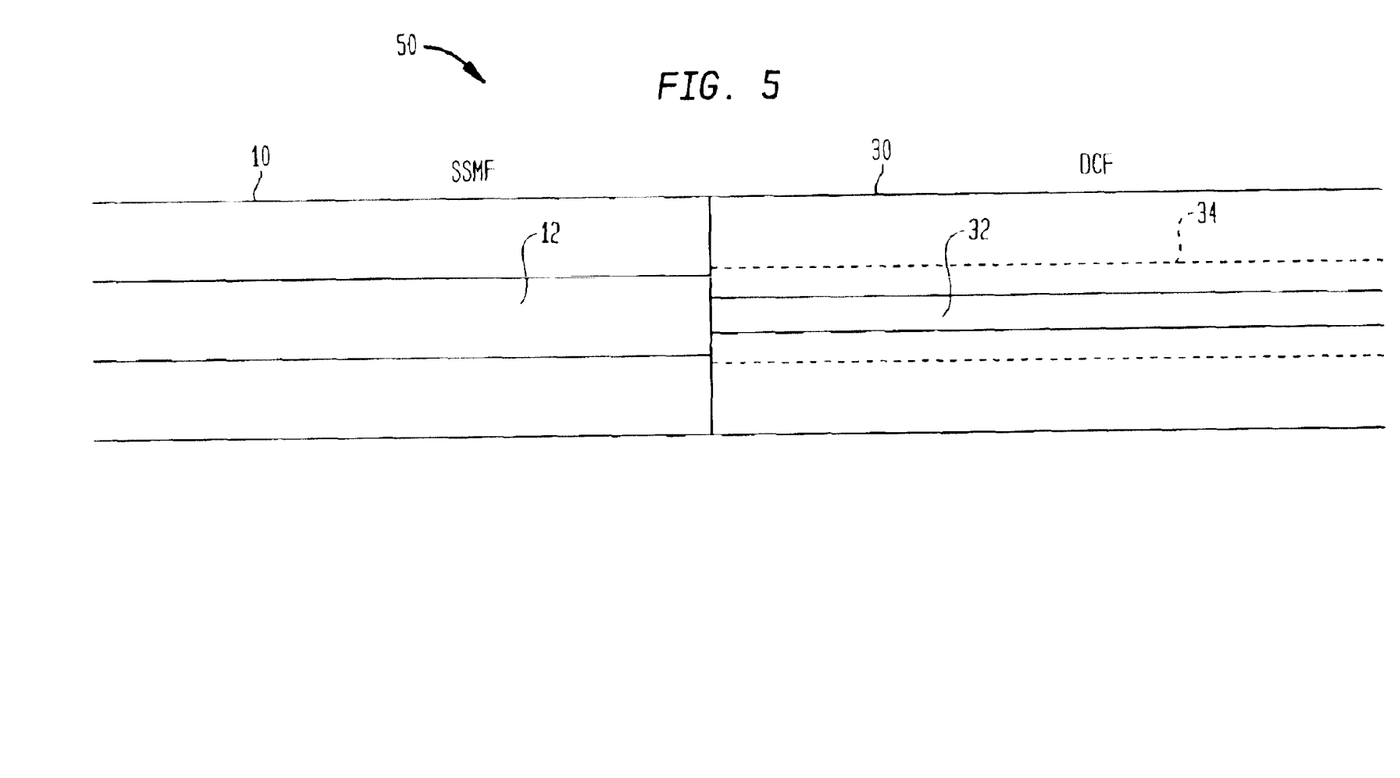
FIG. 5 is a longitudinal cross section of an optical transmission line fabricated from the SSMF shown in FIG. 1 and the DCF shown in FIG. 3.

FIG. 5 is a longitudinal cross section diagram of an optical transmission line 50 that have been fabricated by connecting the SSMF 10 and DCF 30 to each other. It will be seen from FIG. 5 that the SSMF core 12 is significantly larger than the DCF core 32. In addition, it will be seen from FIGS. 2 and 4 that the RI profiles 20 and 40 for the two fibers have a significantly different shape. These differences in diameter and shape result in a significant amount of splice loss.

It is possible to reduce splice loss resulting from core diameter mismatch by thermally diffusing the DCF core 32 to more closely match the size of the SSMF core 12. However, thermal expansion of the DCF core 32 is problematic because of the fluorine-doped cladding layer 34. Because fluorine begins to diffuse at a lower temperature than germanium, the thermal expansion of the DCF germanium core 12 may result in an uncontrolled, uneven diffusion of fluorine dopant in other regions of the DCF, leading to splice loss. This uneven diffusion can occur, for example, where a fusion splicer is used to thermally expand the DCF core.

Figure 6:
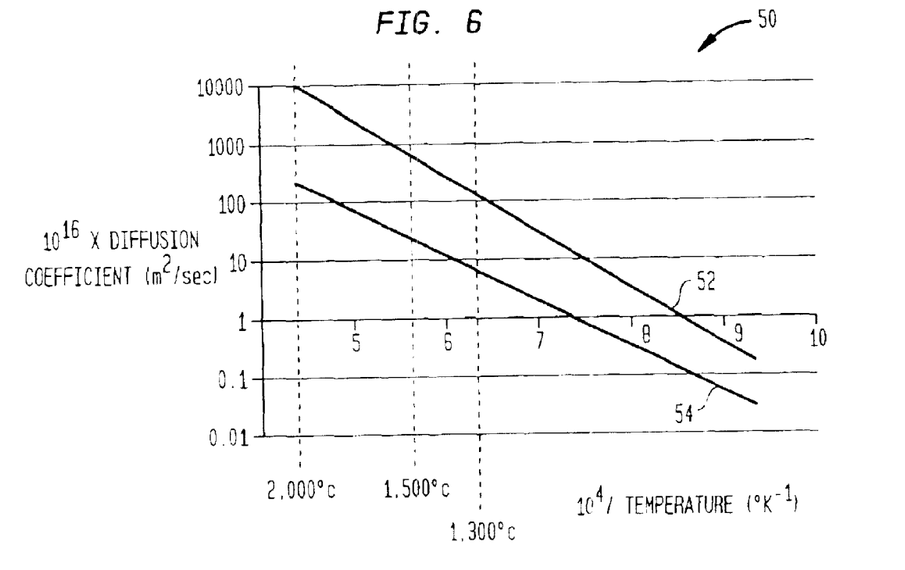
FIG. 6 shows a graph comparing the diffusion characteristics of germanium and fluorine dopant.

FIG. 6 shows a graph 52 comparing the diffusion behavior of fluorine, upper trace 54, with the diffusion behavior of germanium, lower trace 56. In graph 52, diffusion coefficient is shown as a function of temperature. The x-axis and y-axis are calibrated to produce downward-sloping straight lines for purposes of comparison. The x-axis is calibrated in units of:

$$1000 \cdot \frac{1}{°K}$$

Movement from left to right along the x-axis corresponds to a decrease in temperature. The points of the x-axis corresponding to 2,000° C., 1,500° C. and 1,300° C. are marked for purposes of illustration. The y-axis is calibrated in units of:

$$10^{16} \cdot \frac{m^2}{sec}$$

Also, the y-axis is scaled logarithmically. Thus, each division of the y-axis represents a ten times difference in diffusion coefficient.

When a fusion splicer is used to splice a DCF to another fiber type having a larger modefield diameter, and to cause a thermal expansion of the DCF core, the spliced region of DCF fiber typically reaches a temperature of approximately 2,000° C. It has been observed that fluorine begins to diffuse at about 1,100° C. As shown in FIG. 6, at 2,000° C., fluorine has a diffusion coefficient that is more than 20 times greater than the diffusion coefficient of germanium. Thus, as the DCF germanium core is being thermally expanded, the fluorine dopant in the DCF cladding layers is being diffused at a much faster rate. However, at 1,300° C., it will be seen that fluorine has a diffusion coefficient that is similar in magnitude to the diffusion coefficient of germanium at 2,000° C., while the diffusion coefficient of germanium has dropped to an extremely low level.

Figure 7:
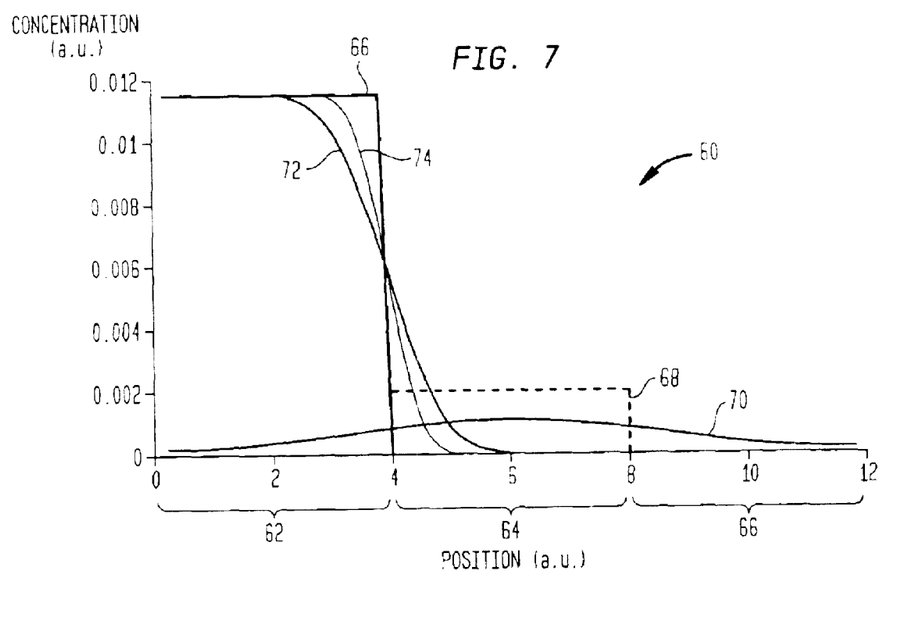
FIG. 7 shows a graph illustrating a differential diffusion technique.

FIG. 7 is a graph 60 comparing the diffusion of dopants in a sample of DCF at 2,000° C. and 1,300° C. In the graph 60, the x-axis represents radial position in the sample of DCF, and includes a first region 62 corresponding to the DCF core 32, prior to heating, a second region 64 corresponding to the first cladding layer 34, prior to heating, and a third region 66 corresponding to the outer cladding layers 36, prior to heating. The y-axis represents dopant concentration.

Graph 60 illustrates the concentration of fluorine and germanium in the DCF before and after heat treatment. The pre-treatment concentration of germanium is represented by solid rectangular trace 66, and the pre-treatment concentration of fluorine is represented by dotted rectangular trace 70. As illustrated in graph 60, in the pre-treated fiber, the germanium dopant is evenly distributed across the core 62 and the fluorine dopant is evenly distributed across the first cladding layer 64.

To illustrate the operation of the differential diffusion technique, a first sample of DCF was heated to 2,000° C., and a second sample of DCF was heated to 1,300° C. Each of the samples was heated for a time sufficient to cause the fluorine dopant in the first cladding layer 64 to diffuse to the concentration profile illustrated by trace 70. It will be seen from graph 60 that, after the heat treatment, a portion of the fluorine dopant has diffused into the core region 62 and into the outer cladding layer region 66. Returning to FIG. 6, it is apparent from graph 52 shown in FIG. 6 that fluorine diffuses at a much faster rate at 2,000° C. than at 1,300° C. Thus, the amount of time $T_1$ required at 2,000° C. to cause the fluorine dopant to diffuse to the concentration profile 70 shown in FIG. 7 will be significantly less than the amount of the time $T_2$ required at 1,300° C.

In the graph 60 shown in FIG. 7, trace 72 illustrates the resulting concentration profile of germanium dopant after the DCF sample is heated to 2,000° C. for time $T_1$ and trace 74 illustrates the resulting concentration profile of germanium dopant after the DCF sample is heated to 1,300° C. for time $T_2$. At both temperatures, a certain amount of germanium diffuses into the first cladding layer 64. However, a difference between the two traces 72 and 74 arises, due to mutual variation in the respective diffusion coefficients for the two dopants. As illustrated by the difference between traces 72 and 74, there is significantly less diffusion of germanium at the 1,300° C.

Figure 8:
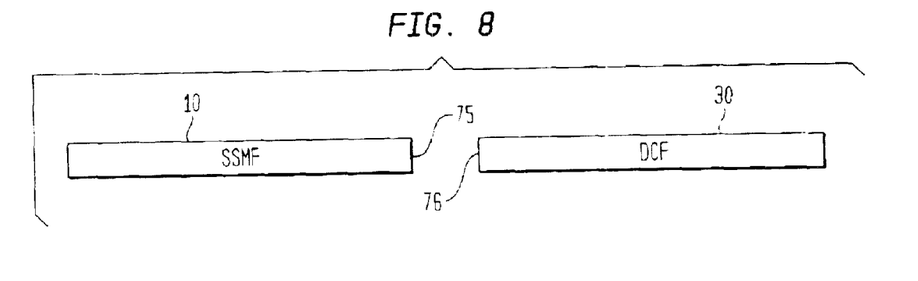
FIGS. 8 through 11 show a series of diagrams illustrating a technique for reducing splice loss in an optical transmission line fabricated from the SSMF shown in FIG. 1 and the DCF shown in FIG. 3.
Figure 9:
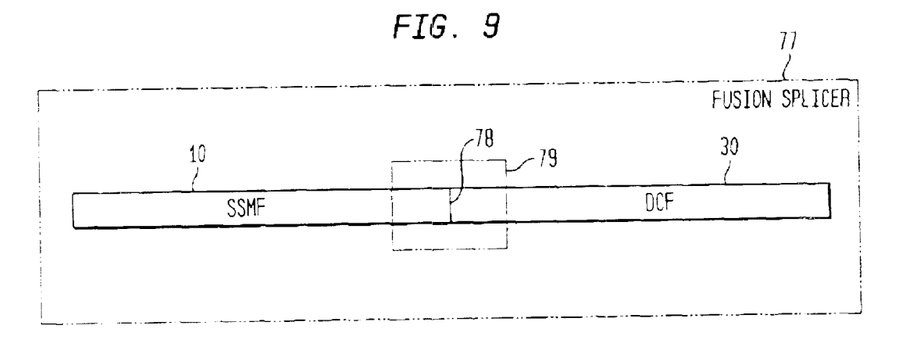

Accordingly, a technique has been developed in which a thermal treatment station is used to heat spliced fibers to a differential diffusion temperature to cause a thermal expansion of the DCF core 32, while also producing a smooth diffusion of fluorine dopant in the DCF first cladding layer 34. FIGS. 8 through 11 are a series of diagrams illustrating a thermal treatment technique according to an aspect of the invention. In FIG. 8, the SSMF 10 and the DCF 30 are prepared for splicing. This preparation may include, for example, cleaving and stripping the fiber ends 75 and 76. In FIG. 9, the fibers 10 and 30 have been loaded into a fusion splicer 77, with the fiber ends 75 and 76 aligned and abutting each other at a splice point 78. An arc current is used to create a hot zone 79 that raises the splice point 78 to a temperature that is sufficient to cause the fiber ends to become fused together at the splice point 78. A typical splice temperature is approximately 2,000° C. In the present example, splicing parameters are chosen that minimize dopant diffusion in the two fibers 10 and 30.

Figure 10:
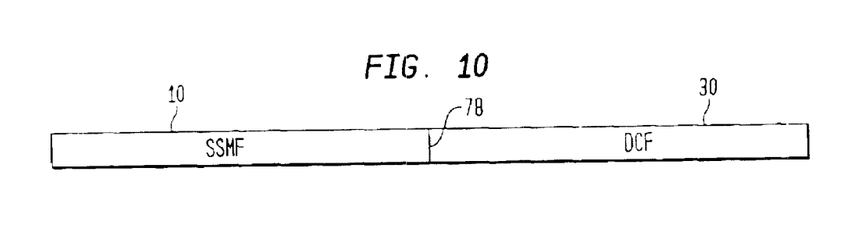
Figure 11:
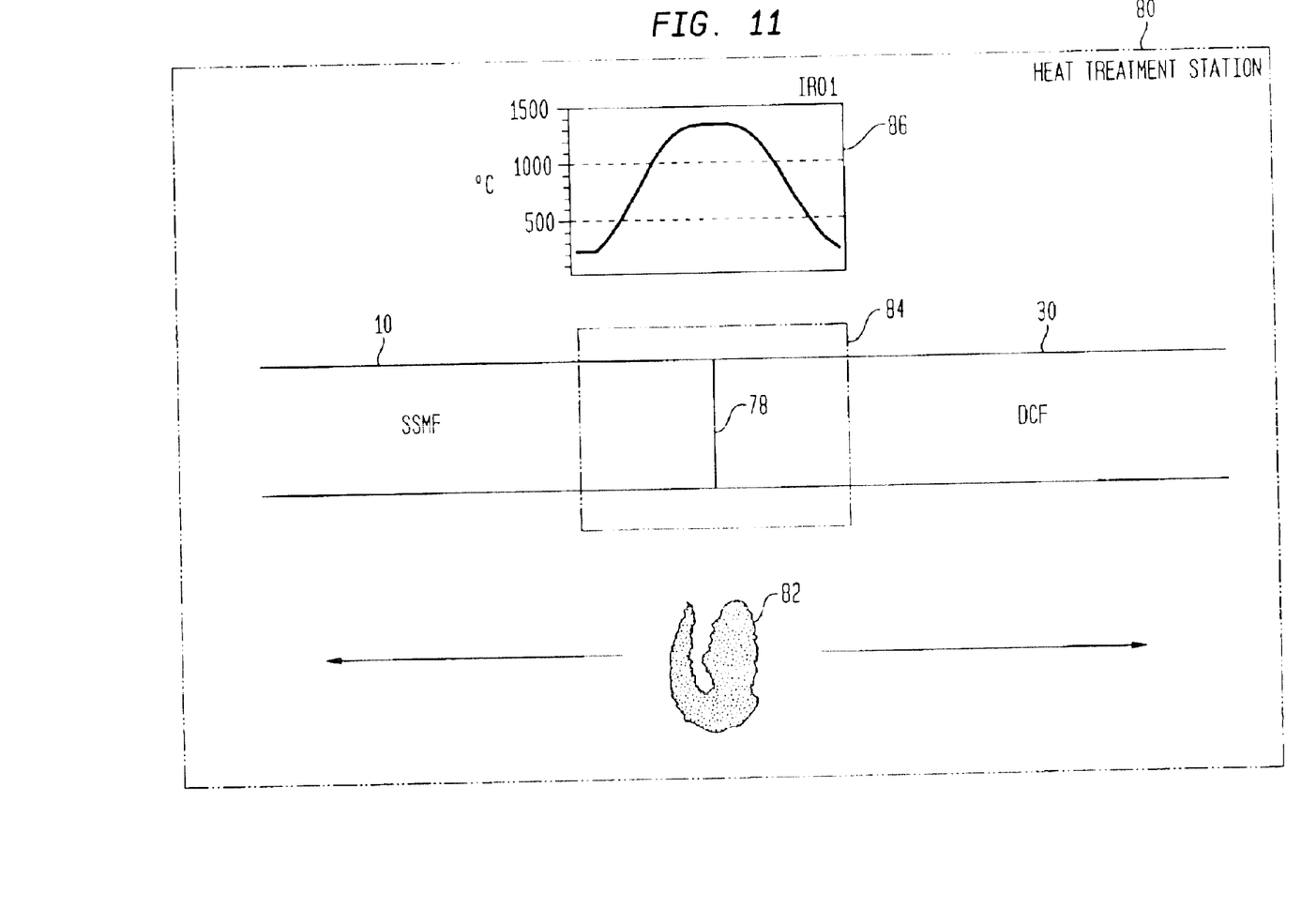

In FIG. 10, the spliced fibers 10 and 30 have been removed from the fusion splicer 78. At this point, the spliced fibers 10 and 30 exhibit a significant amount of splice loss because of modefield mismatch. In FIG. 11, the spliced fibers 10 and 30 have been loaded into a heat treatment station 80, in which a gas torch flame 82 is used to apply heat to a splice zone 84. According to an aspect of the invention, the gas torch flame 82 is scannable in both directions along the length of the SSMF and DCF 10 and 30. In addition, Te intensity of the gas torch flame 82 and the size of the splice zone 84 may be controlled by regulating the gas flow to the torch 82.

The splice zone 84 is heated in accordance with a heating profile 86, which causes a tapered diffusion of the dopants in the SSMF 10 and DCF 30 in the splice zone 84. As shown in the heating profile 86, the splice point 78 is heated to approximately 1,300° C. The temperature of the splice zone 84 tapers off on each side of the splice point 78.

The heating profile 86 was measured using a thermography camera. The x-axis of the heating profile represents distance along the length of a spliced fiber, and the y-axis represents heating temperature. The splice point 78 is located at the center of the heating profile 86, which is approximately 4 mm wide. As shown in the heating profile 86, the splice point 78 is heated to approximately 1,300° C. The amount of heat applied to the spliced fibers drops off approximately sinusoidally on either side of the splice point 78.

Figure 12:
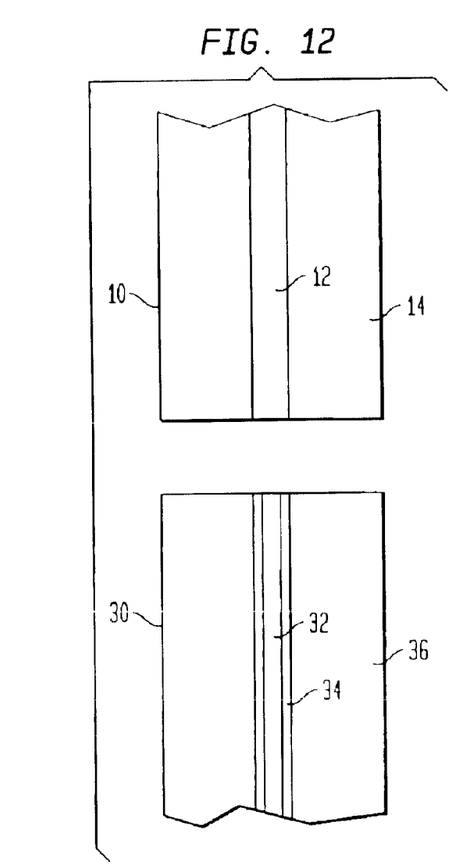
FIGS. 12 through 14 show a series of longitudinal cross section diagrams illustrating changes in the doped components of the SSMF and DCF during the technique illustrated in FIGS. 8 through 11.
Figure 13:
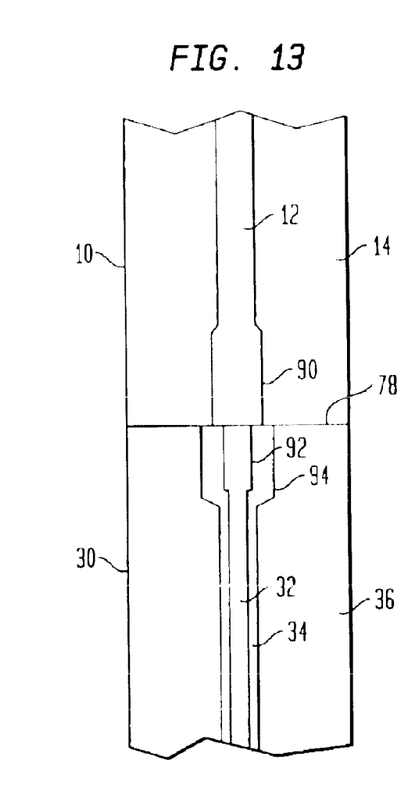
Figure 14:
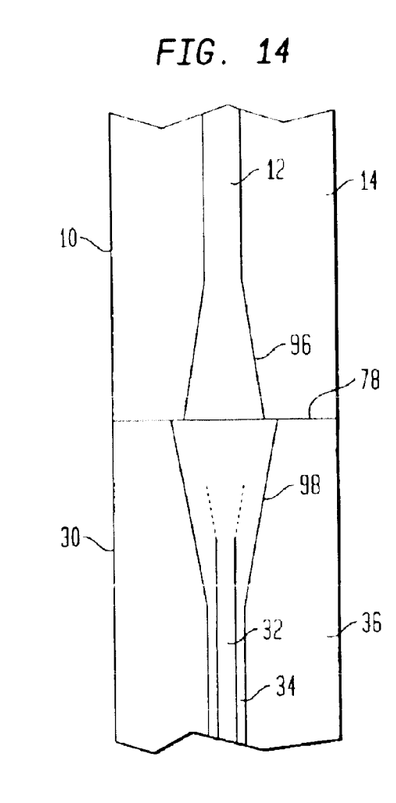

FIGS. 12 through 14 are a series of longitudinal cross section diagrams illustrating the effect of the heat treatment on the dopants in the SSMF 10 and DCF 30. FIG. 12 shows the fibers 10 and 30 prior to splicing. As described above, the SSMF 10 includes a germanium-doped core 12 and an undoped cladding 14. The DCF 30 includes a germanium-doped core 32, a first cladding layer 34, which is heavily doped with fluorine, and an undoped overclad 36.

In FIG. 13, a fusion splicer has been used to splice together the SSMF 10 and the DCF 30 at the splice point 78. The heat of the fusion splicing process has caused some diffusion in the SSMF and DCF dopants. As shown in FIG. 13, the SSMF core 12 includes a slightly expanded portion 90. Similarly, the DCF core 32 and first cladding region 34 also have slightly expanded portions 92 and 94.

As described above, the spliced fibers are then loaded into a heat treatment station. FIG. 14 shows the results of the heat treatment process. It will be seen that the expanded portion of the SSMF core 90 has been shaped into a smooth, tapered pathway 96. The expanded portions of the DCF core and cladding 92 and 94 have blended together, and also form a smooth, tapered pathway 98.

Figure 15:
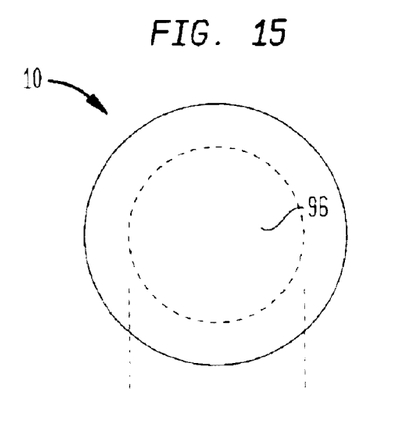
FIG. 15 shows a radial cross section diagram of the SSMF shown in FIG. 14 at the splice point.
Figure 16:
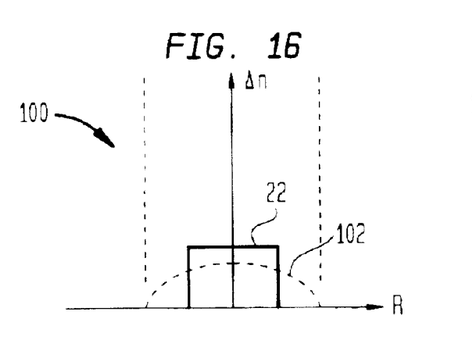
FIG. 16 shows an RI profile of the SSMF shown in FIG. 15.

FIG. 15 shows a radial cross section diagram of the heat-treated SSMF 10 at the splice point 78. The germanium-doped core 12 shown in FIG. 1 has been expanded to the larger, diffused core 95 shown in FIG. 15. FIG. 16 is a graph 100 showing the pre-treatment RI profile 22, and also showing, using a broken line, the post-treatment RI profile 102. As shown in FIG. 16, the post-treatment RI profile does not have square edges, but is now curved, because of the diffusion of germanium dopant. In the splice zone 84, the SSMF 10 makes a smooth transition between the pre-treatment RI profile 22 and the post-treatment RI profile 102. The transition is substantially adiabatic, that is, loss-free.

Figure 17:
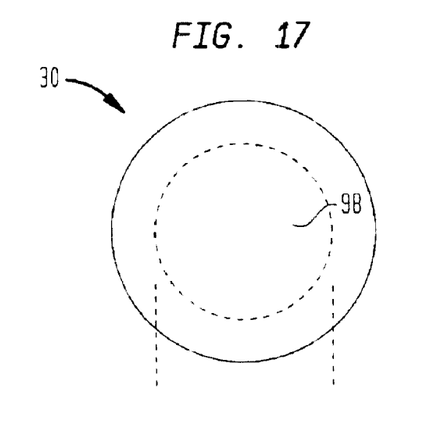
FIG. 17 shows a radial cross section diagram of the DCF shown in FIG. 14 at the splice point.
Figure 18:
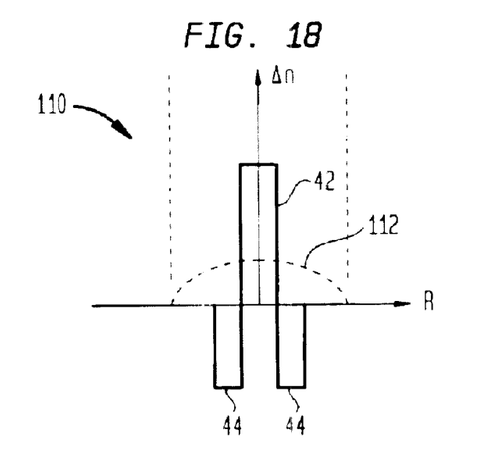
FIG. 18 shows an RI profile of the DCF shown in FIG. 17.

FIG. 17 shows a radial cross section diagram of the heat-treated DCF 30 at the splice point 78. The DCF germanium-coped core 32 and fluorine-doped first cladding layer 34 shown in FIG. 2 have been blended and expanded into the germanium-fluorine core 98 shown in FIG. 17. FIG. 18 is a graph 110 showing the DCF pre-treatment RI profile 42 and 44 and the post-treatment RI profile 112. It will be seen in FIG. 18 that the rectangular peak 42 and negative trenches 44 have been blended into a single, curved profile 112. In the splice zone 84 the DCF makes a smooth, substantially adiabatic transition between the pre-treatment RI profile 42 and 44 and the post-treatment RI profile 112.

It will be seen from FIGS. 15 through 18 that, at the splice point 78, the SSMF and DCF cores 96 and 98 have similar sizes and RI profiles. This similarity reduces the amount of splice loss between the two fibers. It is possible to achieve further splice loss reduction after the heat treatment by scanning the flame 82 along the length of the splice region 84 in the direction of signal propagation. This post-treatment scanning causes a further smoothing of the modefield and dopant transition. In addition, bending loss may be reduced by ramping torch gas flow downward when the spliced fibers are loaded into, and removed from, the thermal treatment station.

The differential diffusion conditions may vary with fiber design, since relative diffusion rates are determined by various fiber design parameters, including dopant concentration profiles, modefield dependence on profile changes, and interaction between different dopants. For example, it has been observed that using phosphorus as a co-dopant has a significant effect on the diffusion behavior of fluorine. Also, low-loss splicing can be obtained at a range of temperatures. For example, when performing high-strength splicing, the temperature used for differential diffusion is expected to be somewhat higher than that shown in the temperature profile 86, because of other restrictions on glass flow for obtaining adequate splice strength.

According to an aspect of the invention, parameters for the heat treatment are determined empirically. In one approach, a trial pair of spliced fibers fiber is loaded into a heat treatment station. The refractive index profile of the fiber is monitored from the side during the heat treatment.

As shown in FIG. 18, prior to heat treatment, the refractive index profile of DCF typically has a central spike 42 and two negative trenches 44 on either side of the spike 42. As the fluorine dopant diffuses, the negative trenches 44 will begin to degrade. When the germanium dopant diffuses, the central spike will begin to degrade 42.

A suitable differential diffusion heating temperature may be determined by visually inspecting the refractive index profile as the spliced fibers are heated, and by keeping track of elapsed time. At a suitable differential diffusion temperature, there will be visible movement in the fluorine-doped regions of the DCF, but no apparent movement in the germanium-doped DCF core. Thus, after the trial spliced fibers have been loaded into the heat treatment station, the refractive index profile is monitored, and the intensity of the heat applied to the splice region is adjusted based upon a visual evaluation of the refractive index profile. If the heating temperature is too cool, there will be no apparent movement in either the fluorine-doped or germanium-doped regions of the DCF. In that case, the temperature is adjusted upwards, for example, by increasing gas flow to the torch flame, until there is a visible movement in the fluorine-doped regions of the DCF. If, on the other hand, the heating temperature is too hot, there will be visible movement in both the fluorine-doped and germanium doped-regions of the DCF. In that case, the temperature is adjusted downwards, for example, by decreasing gas flow to the torch flame, until there is visible movement only in the fluorine-doped regions of the DCF.

The refractive index profile is continuously monitored, until there is no further apparent movement of the fluorine-doped regions of the fiber. Once the heating temperature and amount of time have been established, they may be used in subsequent splices.

According to a further aspect of the invention, once the thermal treatment parameters have been established for a given application, the thermal treatment may be subsequently practiced without ongoing temperature measurement. Instead, a careful control of the processing parameters is made to ensure that the temperature conditions are kept the same during production after they have been determined from experimental trials. According to an aspect of the invention, control is primarily maintained by the following actions: (1) centering of the splice in the flame by using a red laser guide; (2) positioning the fiber over the flame using a translation stage, using a camera image of the splice and flame on a color monitor; and (3) precisely controlling gas flows using a mass flow controller.

When performing the above-described heat treatment, a loss behavior over time has been observed, in which the loss first goes up before dropping down to its minimum. It is believed that this behavior may be caused by the following two effects, or their combination: (1) when the fluorine starts to diffuse, the transition along the induced taper is insufficiently smooth, thereby inducing some mode-coupling; and (2) there may be some intermediate refractive index profiles between the original fiber and the treated fiber, in which light is not guided or makes a very poor match with the other fiber at the splice point. These rather high splice losses are also seen when splicing the above fibers in a conventional fusion splice unit, where the temperature and temperature profile cannot be controlled as well as with the present invention. A precise description of these effects may require a model for calculating the diffusion profile along the taper, and a calculation of how the field will propagate in this taper.

It should be noted that the above-described technique may be modified without departing from the spirit of the invention. For example, it would be possible to use the fusion splicer 70 to perform the expansion of the DCF core 32. The heat treatment station 80 is then used to cause a smooth diffusion of the fluorine-doped cladding layer 34 to reduce splice loss.

This technique may be understood with respect to an example, in which a length of DCF is spliced to a length of SSMF. The two fibers are spliced together using a fusion splicer. During the splicing process, splice loss is monitored and the heating arc is kept on until a target splice loss value is reached, at which point the arc is turned off. The target splice loss value, as well as the splice program parameters, such as the arc current, is determined by optimization for the actual DCF and SSMF used. Details on the implementation of the method depend on the actual splicer used.

For example, for an Ericsson FSU925 fusion splicer, the following approach yields results with high repeatability.

The DCF is spliced to the SSMF using a relatively short fusion time, e.g., 0.3 seconds. After this splice, the splicer is operated in a service mode, in which the arc can be turned on and off manually. A low arc current is used, e.g., 11 mA, to ensure that the process is so slow that it is possible to monitor splice loss manually. The arc is turned off when a desired value is reached. Optimal splice loss after the splicing will typically be in the range of 3–6 dB.

The splice is now ready for the differential diffusion treatment. The spliced fibers are removed from the fusion splicer and loaded into a thermal treatment station 80. The splice region is then heated to a differential diffusion temperature, while splice loss is monitored. As the heat treatment proceeds, the reduction is splice loss will tend to flatten out. The heat treatment is continued until there is no apparent further reduction in splice loss.

Figure 19:
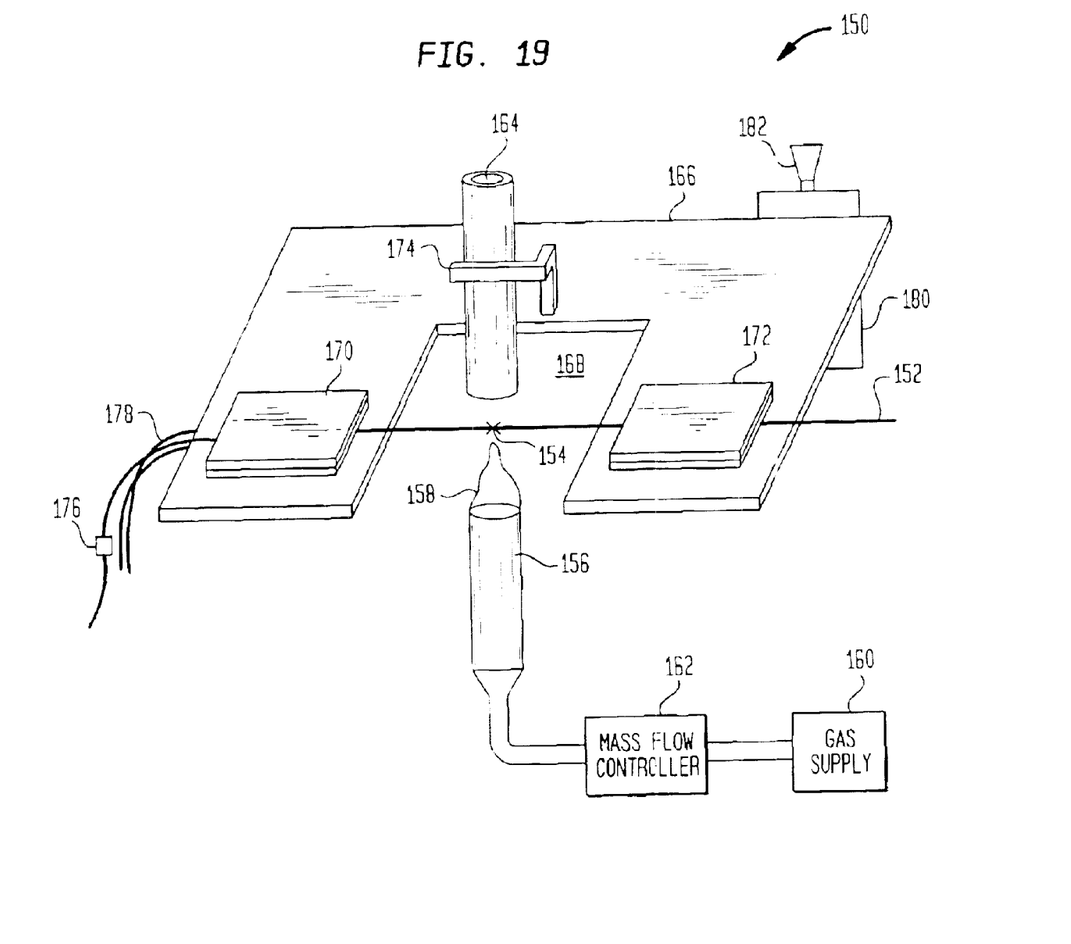
FIG. 19 shows a perspective view of a thermal treatment station suitable for use in conjunction with the present invention.

FIG. 19 shows a perspective view of an example of a heat treatment station 150 that is suitable for use in practicing the techniques described herein. The heat treatment station 150 shown in FIG. 19 is further described in U.S. patent application Ser. No. 09/778,444 now U.S. Pat. No. 6,565,269. It will be appreciated, however, that the techniques described herein may also be practiced with other heat treatment stations, including other heat treatment stations shown and described in U.S. patent application Ser. No. 09/778,444 now U.S. Pat. No. 6,565,269 without departing from the spirit of the invention.

The thermal treatment station 150 shown in FIG. 19 is used to apply heat to a spliced optical fiber line 152. The splice point 154 of the optical fiber 152 is positioned over a heating device 156, which in the present example is implemented using a gas torch with a flame 158 that is fed by a gas supply 160. Other heating elements may suitably be used without departing from the spirit of the invention. In order to precisely regulate the torch 156, the gas supply 160 is provided with a mass flow controller 162. A chimney 164 is positioned over the torch 156 to stabilize the flame 158 during heating. The fiber 152 and chimney 164 are held in position by a plate 166 that includes a cutaway portion 168 for exposing the splice point 154. The fiber 152 is held in position on the plate 166 by first and second clamps 170 and 172 located on either side of the cutaway portion 168, and the chimney 164 is held in position on the plate 166 by an arm 174 that grips the chimney 164.

A slight tension is maintained in the fiber 152 during the heating process by a weight 176 that is removably attached to one end of the fiber. This tension prevents the fiber 178 from moving relative to the flame 158 during the heating process. Care must be taken to decide the right weight to avoid stretching of the fiber when it is heated. In the present example, a weight of 0.7 g is used. The first clamp 170 holds the fiber 172 sufficiently loosely to allow the tension in the fiber 152 to be controlled in this manner and functions as a fiber guide. To prevent bending damage to the fiber 152, a curved guide 178 is provided, upon which the weighted portion of the fiber 152 rests during the heating process.

According to a further aspect of the invention, it has been found that it is desirable, in certain situations, to apply an additional controlled tension to the spliced fiber during the thermal treatment process. This additional tension may be applied by increasing the amount of weight 176 applied to the spliced fiber. Other tensioning mechanisms may also be used.

The plate 166 is movable relative to the torch 156 using a translation stage 180 upon which the plate 166 is mounted. A position reading device 182 provides precise information as to location of the plate 166. When the spliced fiber 152 is initially mounted into the thermal treatment station 150, the plate 166 is positioned far above the flame 158. After mounting, the splice point 154 is moved into the flame using the translation stage 180. For repeatable results, the position of the translation stage 166 is monitored using the position reading device 182. Once an optimal position for the splice point 154 with respect to the flame 158 is determined, this position is used for subsequent thermal treatments.

The torch 156 is fabricated from a quartz tube having an inner diameter of approximately 4 mm. Since the temperature necessary to diffuse the fluorine is estimated to be approximately 1,200–1,300° C., a gas such as propane or hydrogen without an additional oxygen supply can be used. The mass flow controller 162 is used to keep the gas flow at the right value. Typical flows are about 10 ml/min for propane. Again, this value must be optimized for the particular fibers used.

The splice loss is monitored while the splice 154 is in the flame 158. When the minimum splice loss is reached, in approximately 10 minutes, the translator 180 is used to remove the splice 154 from the flame 158. The splice 154 can now be removed from the thermal treatment station 150. The thermal treatment station 150 shown in FIG. 18 requires only 1 cm of bare fiber 152 at the splice point 154. Thus, the thermal treatment station 150 provides for compact splice protection.

Figure 20:
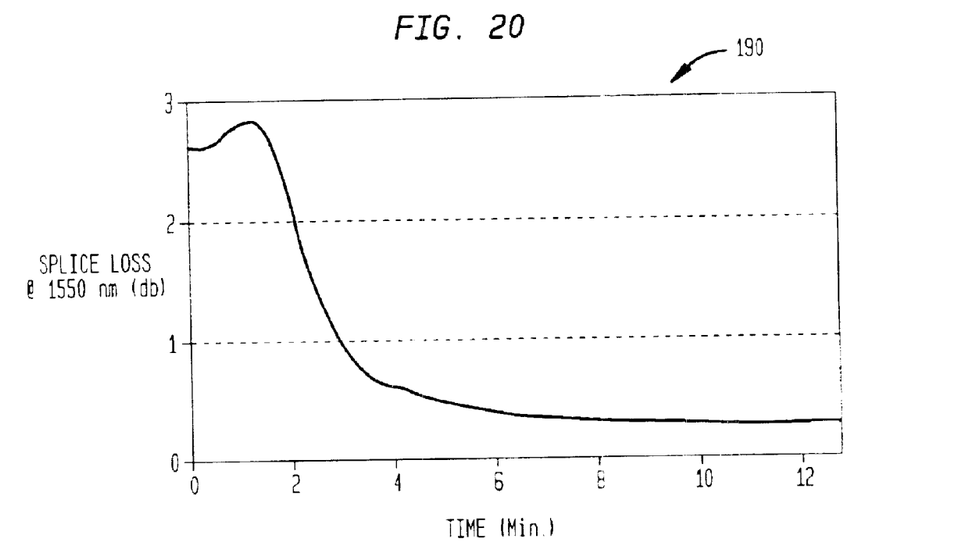
FIG. 20 shows a graph mapping splice loss as a function of thermal treatment time.

FIG. 20 shows a graph 190 illustrating typical behavior of splice loss as a function of time of thermal treatment using the thermal treatment station 100 shown in FIG. 7. For comparison, the lowest splice loss that can be obtained for the actual DCF design is approximately 0.8 dB, when only a fusion splicer is used. One feature of the present technique is that it can be performed in a relatively short amount of time. Using the fusion splicer to splice together the two fibers and create the desired core expansion typically requires only a few minutes. Using thermal treatment to create the desired diffusion of the fluorine dopant in an exemplary DCF requires only 10 minutes, approximately, for reaching a minimum splice loss value.

Figure 21:
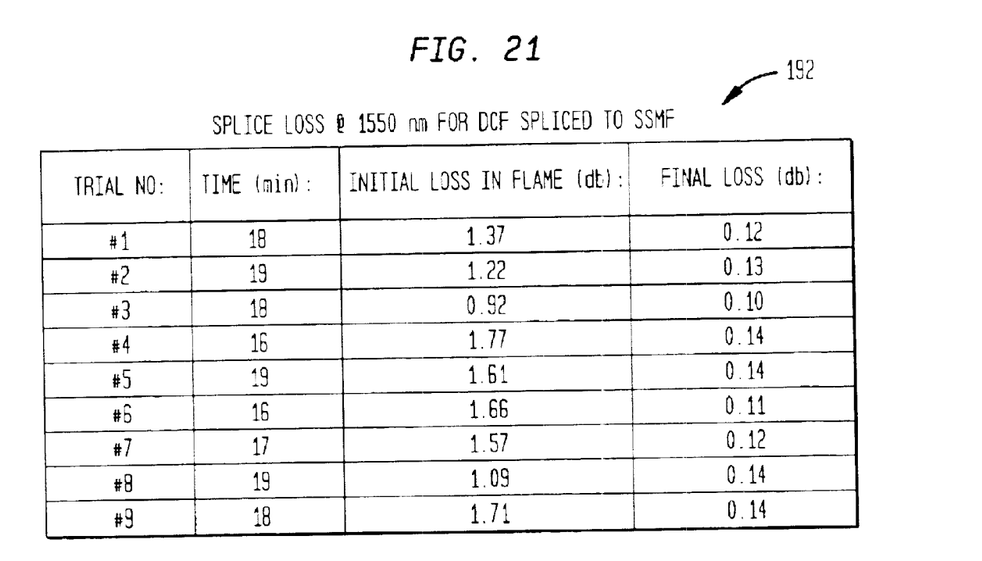
FIG. 21 shows a table setting forth reductions in splice loss obtained using an aspect of the present invention.

FIG. 21 shows a table 180 setting forth typical loss values at 1550 nm resulting from applying the above described techniques to a length of DCF spliced to a length of SSMF. The DCF used for the splices was Standard Dispersion Compensating Fiber manufactured at OFS Fitel Denmark I/S. The SSMF was Corning SMF28 fiber. A combination of propane-butane and oxygen were used to obtain these splice losses.

Figure 22:
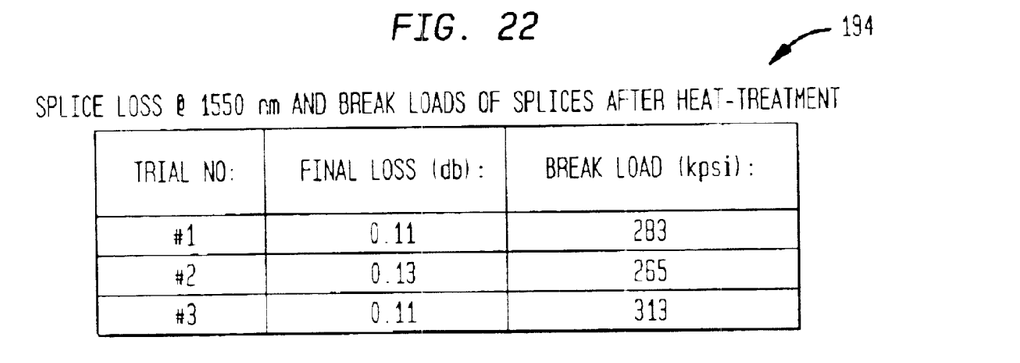
FIG. 22 shows a table setting forth results obtained in practicing the present invention in a high-strength splicing application.

It is also possible to apply the above-described techniques in a high-strength splicing application. FIG. 22 shows a table 190 setting forth splice data at 1550 nm having some of the best break loads obtained for splices made with a high-strength splicing setup and subsequently heat-treated according to the present invention. Again, a combination of propane-butane and oxygen were used. High-strength splicing techniques are described in greater detail in U.S. patent application Ser. No. 10/197,192, entitled " ", which in being filed on even date herewith.

Figure 23:
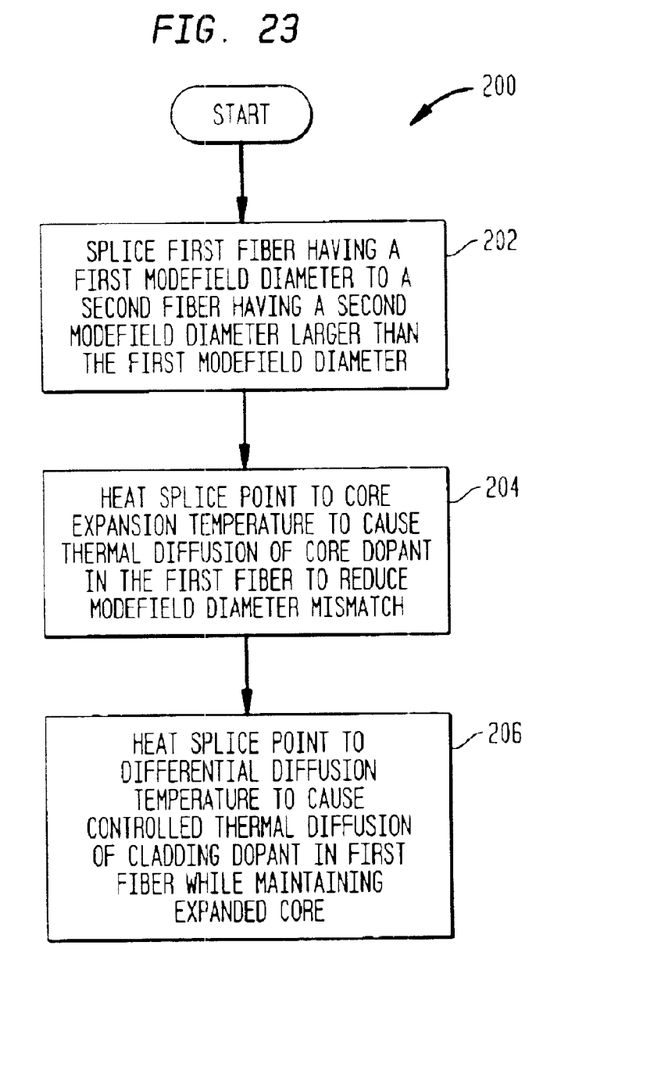
FIG. 23 shows a flowchart of a method according to an aspect of the invention for reducing splice loss in an optical fiber transmission line.

FIG. 23 shows a flowchart of a differential diffusion method according to the invention. In step 202, a first fiber having a first modefield diameter is spliced to a second fiber having a second modefield diameter that is greater than the first modefield diameter. In step 204, the splice point is heated to a core expansion temperature to cause a controlled thermal diffusion of a core dopant in the first fiber, thereby causing an expansion of the modefield of the first fiber to reduce the modefield mismatch. In step 206, the spliced fiber is heated to a differential diffusion temperature to cause a controlled diffusion of a cladding dopant in the first fiber, while preserving the expanded core of the first fiber. As described above, steps 202 and 204 may be performed using a fusion splicer, and step 206 may be performed using a thermal treatment station, such as the thermal treatment stations shown in FIG. 19.

Figure 24:
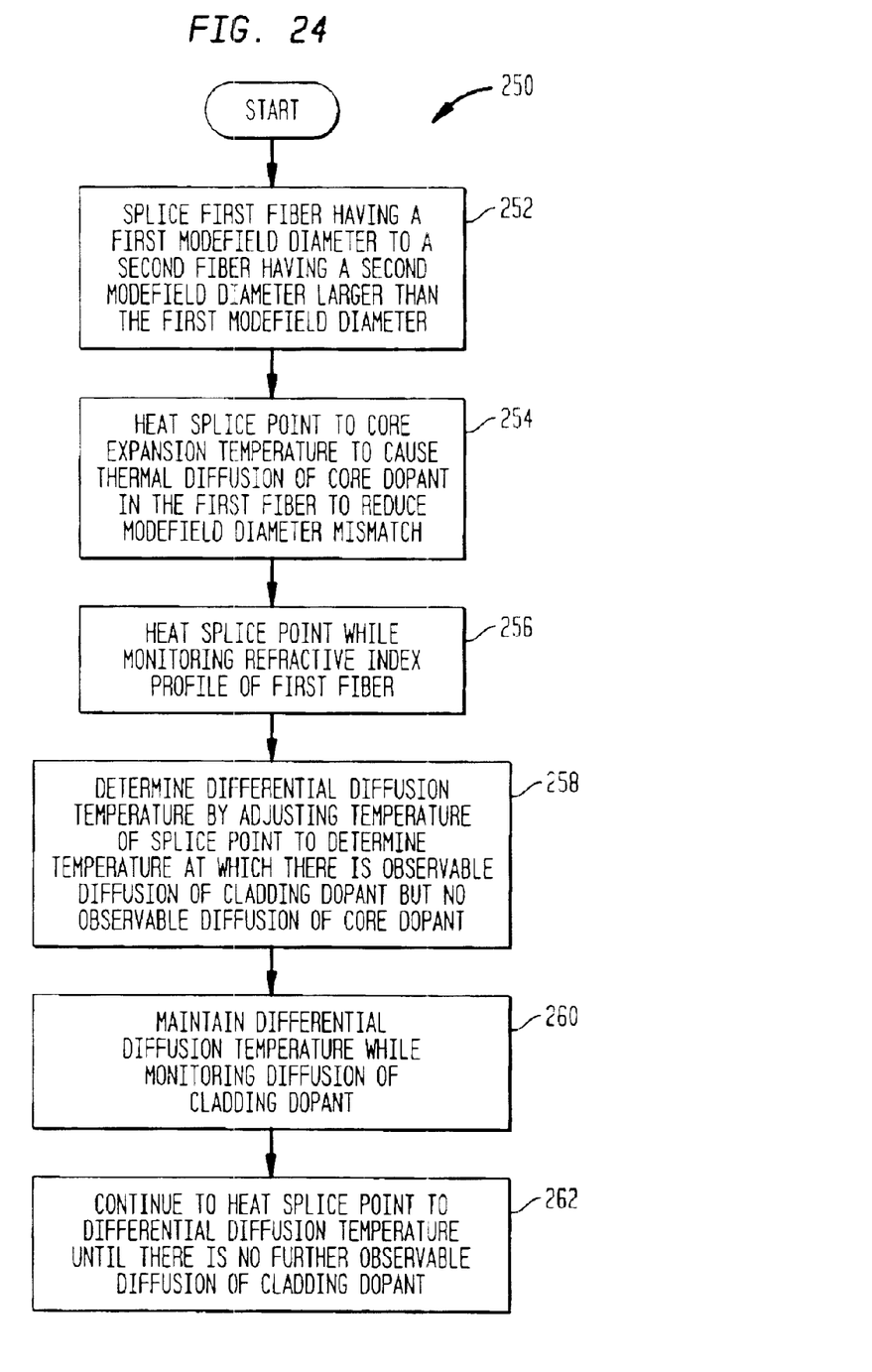
FIG. 24 shows a flowchart of a method according to an aspect of the invention for determining differential diffusion parameters for reducing splice loss in an optical fiber transmission line.

FIG. 24 shows a flowchart of a method 250 according to the invention for empirically determining differential diffusion conditions for a particular spliced fiber. In step 252, a first fiber having a first modefield diameter is spliced to a second fiber having a second modefield diameter that is greater than the first modefield diameter. In step 254, the splice point is heated to a core expansion temperature to cause a controlled thermal diffusion of the first fiber's core dopant, thereby causing an expansion of the first fiber's modefield, to reduce modefield mismatch. In step 256, the spliced fibers are loaded into a thermal treatment station, and heat is applied to the splice point while monitoring the refractive index profile of the first fiber. In step 258, a differential diffusion temperature is determined by increasing or decreasing the gas flow to the torch flame until there is visible movement only in the fluorine doped regions of the first fiber. Once the differential diffusion temperature has been determined, a differential diffusion time is determined by monitoring the refractive index profile, and determining at what point in time there is no further observable change in the cladding dopant. As mentioned above, once the differential diffusion conditions have been determined, they may be repeated without monitoring, by carefully repeating the heat treatment parameters.

It should be noted that the present invention is not limited to the dopants fluorine and germanium, or to optical fibers only containing two dopants. Depending upon the respective diffusion profiles of dopants in an optical fiber, it will be seen that differential diffusion may be used to cause a controlled diffusion of one or more dopants having lower-temperature diffusion profiles, while leaving substantially unaffected one or more dopants having higher-temperature diffusion profiles. Suitable heating temperatures and heating profiles could be determined empirically, using techniques similar to those described above.

It should further be noted that the above-described differential diffusion technique may be applied in conjunction with different types of fibers and dopants. For example, it would be possible to use a differential diffusion technique to cause a controlled diffusion of a core dopant while leaving a cladding dopant unaffected.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A method for fabricating a low-loss an optical fiber transmission line, comprising:
    (a) splicing together at a splice point a first fiber having a doped core and at least one doped cladding region defining a first modefield diameter to a second fiber having a second modefield diameter larger than the first modefield diameter;
    (b) loading the spliced fibers into a heat treatment station;
    (c) heating a splice zone including the splice point according to a heating profile to cause a tapered expansion of the doped core, while causing a smooth diffusion of the doped cladding region, in order to reduce modefield mismatch between the first and second fibers.

2. The method of claim 1, wherein the first fiber is an inverse dispersion fiber.

3. The method of claim 2, wherein the first fiber is a dispersion compensating fiber.

4. The method of claim 2, wherein the core region is doped with germanium, and wherein the cladding region is doped with fluorine.

5. The method of claim 2, wherein the second fiber is a standard single mode fiber.

6. The method of claim 1, wherein step (c) includes applying a controlled tension across the splice point as it is heated to the differential diffusion temperature.

7. The method of claim 1, wherein step (a) includes using a fusion splicer to splice together the first and second fibers.

8. A method for determining differential diffusion parameters, comprising:

(a) splicing together at a splice point a first fiber having a doped core and at least one doped cladding region defining a first modefield diameter to a second fiber having a second modefield diameter larger than the first modefield diameter;

(b) loading the spliced fibers into a heat treatment station;

(c) applying heat from a heating source to a splice zone including the splice point, while monitoring the first fiber's refractive index profile, the refractive index profile including portions corresponding to the doped core and cladding regions of the first fiber;

(d) adjusting the heat source until there is a visible movement in the cladding region refractive index profile and no visible movement in the core region refractive index profile; and (e) continuing to apply heat to the splice zone until there is no further visible movement in the cladding region refractive index profile.

9. The method of claim 8, wherein the first fiber is an inverse dispersion fiber.

10. The method of claim 9, wherein the first fiber is a dispersion compensating fiber.

11. The method of claim 10, wherein the core dopant is germanium and the cladding dopant is fluorine.

12. The method of claim 9, wherein the second fiber is a standard single mode fiber.

13. The method of claim 8, wherein step (c) includes applying a controlled tension across the splice point, while applying heat to the splice point.

14. A method for fabricating a low-loss optical transmission line:

(a) using a fusion splicer to splice together at a splice point a first fiber having a doped core and at least one doped cladding region defining a first modefield diameter to a second fiber having a second modefield diameter larger than the first modefield diameter;

(b) using the fusion splicer to cause a thermal expansion of the first fiber's doped core, such that modefield mismatch between the first and second fibers is reduced;

(c) loading the spliced fibers into a heat treatment station; and (d) heating a splice zone including the splice point according to a heating profile to cause a smooth diffusion of the first fiber's doped cladding region, while maintaining the first fiber's expanded core, thereby reducing splice loss.

15. The method of claim 14, wherein the first fiber is an inverse dispersion fiber.

16. The method of claim 15, wherein the first fiber is a dispersion compensating fiber.

17. The method of claim 15, wherein the core region of the first fiber is doped with germanium, and wherein the cladding region of the first fiber is doped with fluorine.

18. The method of claim 15, wherein the second fiber is a standard single mode fiber.

19. The method of claim 14, wherein step (d) includes applying a controlled tension across the splice point, while applying heat to the splice point.

* * * * *